(12) United States Patent
Adams et al.

(10) Patent No.: US 6,189,037 B1
(45) Date of Patent: *Feb. 13, 2001

(54) BROADBAND DATA INTERFACE

(75) Inventors: Robert Adams, Lake Oswego; John W. Richardson; David Williams, both of Portland, all of OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/859,009

(22) Filed: May 20, 1997

Related U.S. Application Data (63) Continuation of application No. 08/315,754, filed on Sep. 30, 1994, now abandoned.

(51) Int. Cl.[7] ........................................ G06F 15/16
(52) U.S. Cl. ............................... 709/230; 709/203
(58) Field of Search .................... 370/271, 447, 370/432, 420, 260; 348/13, 426; 395/200.5; 375/242; 709/230, 203

(56) References Cited

U.S. PATENT DOCUMENTS

| | | | |
|---|---|---|---|
| 4,442,715 | * | 4/1984 | Brisken et al. .................... 73/626 |
| 4,577,314 | * | 3/1986 | Chu et al. ......................... 370/420 |
| 4,716,574 | * | 12/1987 | Baier et al. ....................... 375/200 |
| 4,800,559 | * | 1/1989 | Florea et al. ..................... 370/402 |
| 4,849,961 | * | 7/1989 | Sturza ............................... 370/125 |
| 5,029,333 | * | 7/1991 | Graves et al. .................... 370/490 |
| 5,142,532 | * | 8/1992 | Adams .............................. 370/432 |
| 5,245,459 | * | 9/1993 | Faulkner et al. ................. 359/125 |
| 5,311,593 | * | 5/1994 | Carmi ................................. 380/23 |
| 5,333,134 | * | 7/1994 | Ishibashi et al. ................. 370/447 |
| 5,339,403 | * | 8/1994 | Parker ............................... 711/221 |
| 5,365,272 | * | 11/1994 | Siracusa ............................ 348/426 |
| 5,394,439 | * | 2/1995 | Hemmati .......................... 375/242 |
| 5,436,890 | * | 7/1995 | Read et al. ....................... 370/352 |
| 5,592,478 | * | 1/1997 | Weiss ................................ 370/260 |
| 5,629,978 | * | 5/1997 | Blumhardt et al. .............. 370/271 |
| 5,635,979 | * | 6/1997 | Kostreski et al. ................ 348/13 |
| 5,666,293 | * | 9/1997 | Metz et al. ..................... 395/200.5 |

* cited by examiner

Primary Examiner—Albert De Cady
Assistant Examiner—David Ton
(74) Attorney, Agent, or Firm—Blakely, Sokoloff, Taylor & Zafman LLP (57) ABSTRACT

A broadband data interface and a broadband digital interface couples broadband systems to digital client systems. The broadband digital interface is coupled to the digital client systems to transfer data to and from the digital client systems. The broadband digital interface is owned and controlled by the digital client systems. The broadband data interface interfaces broadband systems to the broadband digital interface. The broadband data interface is customized for the particular broadband system such that the broadband data interface is owned and controlled by the operator of the broadband system. The broadband data interface contains a broadband receiver and network access control to permit the broadband system operator to implement access control for data transmitted from the broadband system to the clients. The broadband data interface further includes a broadband transmitter and broadband access control to transfer data from the broadband digital interface to the broadband system and to provide access control to the broadband system.

34 Claims, 7 Drawing Sheets

BROADBAND DATA INTERFACE

This is a continuation of application Ser. No. 08/315,754, filed Sep. 30, 1994, now abandoned.

FIELD OF THE INVENTION

The present invention relates to the field of communications, and more specifically to a broadband interface for digital client devices.

BACKGROUND OF THE INVENTION

Computer systems perform a variety of functions including data acquisition, data processing and display of graphical images. The ability to integrate different external sources under control of a computer system generates a variety of applications for computer systems. For example, computer systems find applications in video teleconferencing, wherein the computer system transmits and receives audio/video information. In order to effectively implement such applications, computer systems require the ability to transmit and receive large amounts of data. In order to transmit and receive the large amounts of data, high bandwidth communication systems, such as broadband systems, are required.

Broadband systems, such as satellite networks, cable television, and telephone systems, provide high bandwidth for data transmission. Each broadband system contains a unique modulation scheme. For example, a cable television system may utilize a form of frequency modulation to encode audio/video data, while a satellite system may utilize a form of phase shift keying to encode data. Because of this, the development of a standard interface for computer systems to broadband systems is difficult.

In addition to the unique encoding schemes utilized by different broadband systems, the owner and operator of each broadband system requires control access to and from the broadband system. For example, the owner of a cable television system requires that a client receive only the channels for which that particular client is authorized to receive. A completely standardized broadband interface would permit a client to receive all information transmitted over the broadband system. Therefore, it is desirable to provide an interface to a broadband system that permits the owner of the broadband system to control access to and from the broadband system.

Computer networking standards exist for interfacing multiple computer systems. Such standards provide a means for a computer system owner to simply interface to a number of devices that comply with the particular standard. Therefore, it is desirable to provide a standard interface that permits computer systems to interface to broadband systems.

SUMMARY AND OBJECTS OF THE INVENTION

Therefore, it is an object of the present invention to provide an interface to a broadband system that permits the owner of the broadband system to control access to and from the broadband system.

It is another object of the present invention to provide a standard interface from a digital client system to a broadband system.

It is a further object of the present invention to provide an interface to a broadband system that permits the broadband system owner to change the encoding and access control to the broadband system without affecting the interface equipment owned and controlled by the digital client system.

These and other objects of the present invention are realized in a broadband data interface and a broadband digital interface that interfaces broadband systems to digital client systems. The broadband digital interface is coupled to the digital client systems to transfer digital data to and from the digital client systems. The broadband digital interface is owned and controlled by the digital client systems. The broadband data interface interfaces broadband systems to the broadband digital interface. The broadband data interface is customized for the particular broadband system such that the broadband data interface is owned and controlled by the operator of the broadband system.

In order to transfer data to the broadband digital interface from the broadband system, the broadband data interface contains a broadband receiver that receives data from the broadband system, and demodulates the data in accordance with the particular coding of the broadband system. The broadband receiver also formats data to transmit over the broadband digital interface. The broadband data interface further includes network access control to permit the broadband system operator to implement access control for data transmitted from the broadband system to the clients.

The broadband data interface further includes a broadband transmitter and broadband access control to transfer data from the broadband digital interface to the broadband system. The broadband access control provides access control by the operator of the broadband system for data transferred from the broadband digital interface to the broadband system. The broadband transmitter modulates data in accordance with the particular broadband system encoding scheme, and transmits the modulated data on the broadband system.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Figure 1:
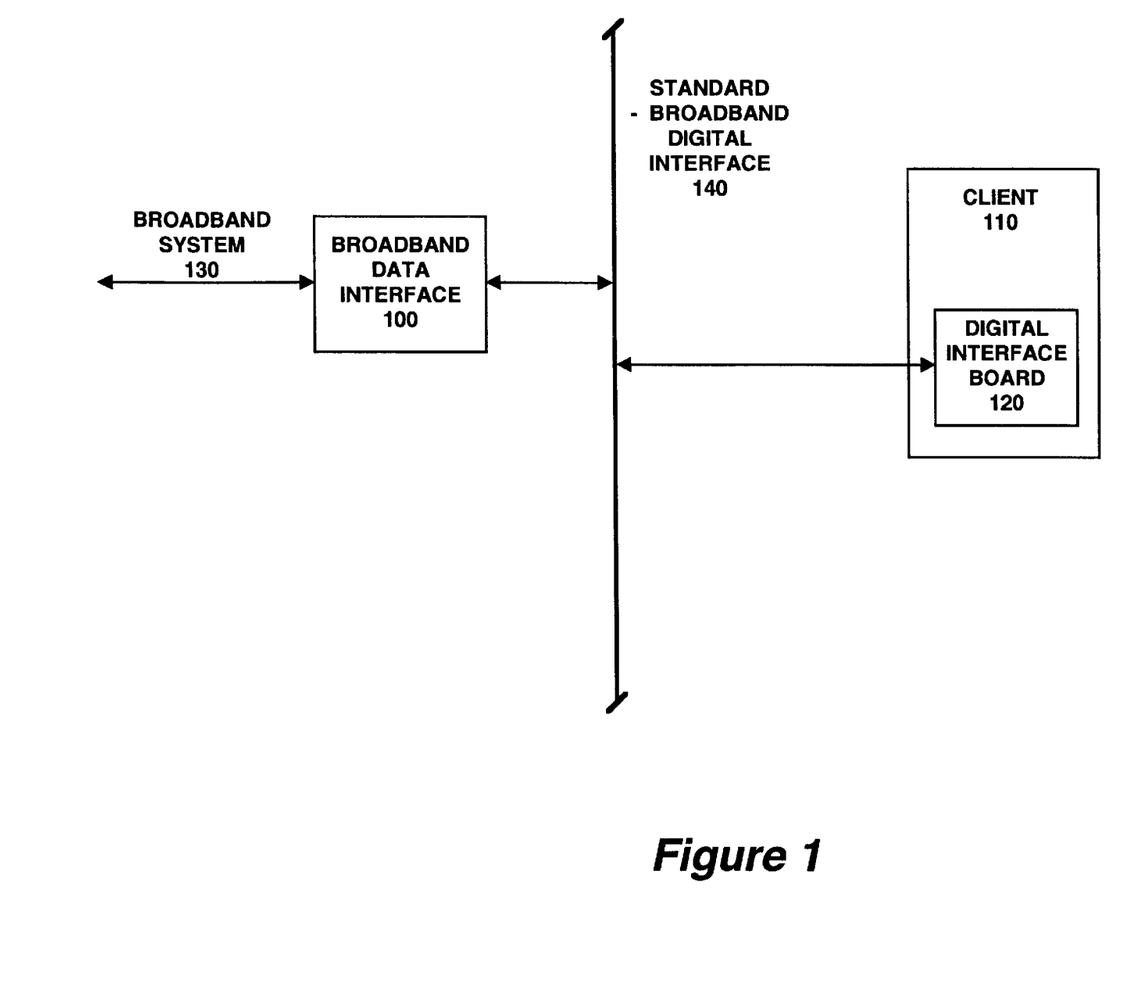
FIG. 1 is a high level block diagram illustrating a broadband interface system configured in accordance with the present invention.

FIG. 1 is a high level block diagram illustrating a broadband interface system configured in accordance with the present invention. The broadband interface system contains at least one client, such as client 110, a standard broadband digital interface 140, a broadband data interface 100, and a broadband system 130. The broadband system 130 may comprise any broadband communications system, such as a cable television system, telephone, satellite network or computer network. In general, the broadband data interface 100 provides a standard interface for data networking on different broadband systems that use different access control and physical layer data transport. For the system illustrated in FIG. 1, the broadband data interface 100 couples the standard broadband digital interface 140 to the broadband system 130.

As is explained more fully below, the standard broadband digital interface 140 provides an interface to the broadband data interface 100, so that only one standard interface needs to be defined in order to interface clients to different broadband systems. In order to interface the client 110 to the standard broadband digital interface, the client 110 includes a digital interface board 120. The client 110 transmits and receives data to and from the standard broadband digital interface 140 via the digital interface board 120.

In a broadband system that has numerous access control issues, the owner of the broadband system desires to own the interface and control the access to the broadband system. Therefore, a standard broadband interface that interfaces all broadband systems to client users is not a desirable solution for the broadband system owner and operator. However, such a standard interface to all broadband systems is desirable to the client because the client could interface to more than one broadband system without having different interfaces for each broadband system.

In one embodiment, the broadband data interface 100 is the physical demarcation between the ownership and control of the broadband system and the client. In this configuration, the standard broadband digital interface 140 is owned and controlled by the client. The system of the present invention provides a demarcation between the ownership and control of the broadband system and the client to meet both the needs of the broadband system operator and the client. For example, in a cable television system, the cable operator retains legal control over the broadband data interface 100. Therefore, the cable operator may legally prohibit physical tampering.

In a preferred embodiment, the standard broadband digital interface 140 does not contain any access control and radio frequency (RF) processing. Because of this, the standard broadband digital interface 140 does not require any industry-wide standards for access control or RF coding. By implementing the broadband data interface 100 in a system interface, the operator of a broadband system has a compatible interface with the standard broadband digital interface 140 so that the broadband system operator can improve or change the digital communications system without rendering the client interface equipment obsolete. In addition, the broadband system operator may provide a rental or lease revenue arrangement for the broadband data interface 100.

In a preferred embodiment, the standard broadband digital interface 140 comprises an industry standard interconnection interface that is incorporated into digital ready clients. For example, for such a standard broadband digital interface, televisions and computer systems are configured with the digital interface board 120 to provide digital ready televisions and computer systems. In addition to separating the ownership and control of access, the broadband data interface 100 provides a consistent interface to data equipment on different and otherwise incompatible broadband systems. Consequently, the broadband data interface 100 provides a standard broadband digital interface for interfacing digital data devices, such as a computer system, to broadband systems.

Figure 2:
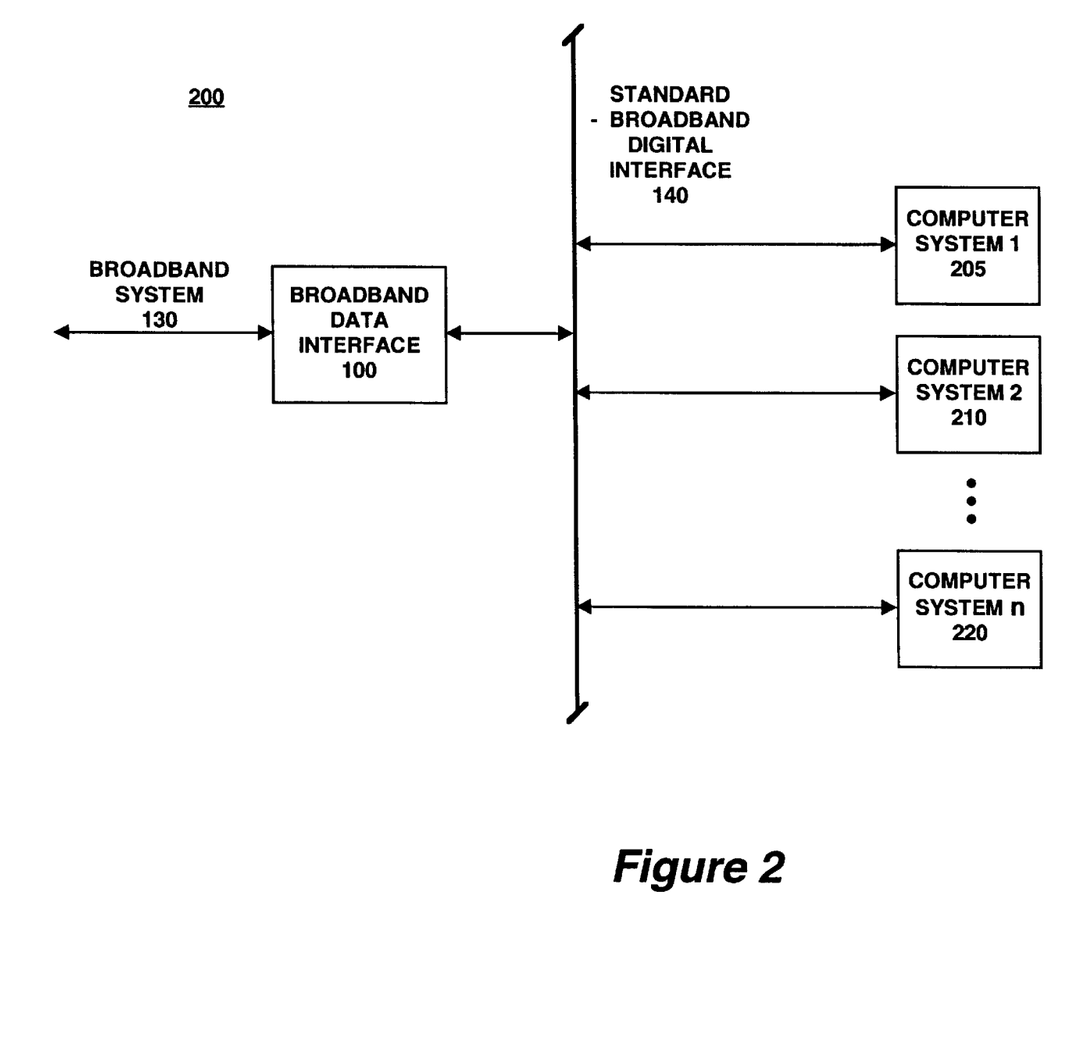
FIG. 2 is a block diagram illustrating one embodiment for the broadband interface system of the present invention.

FIG. 2 is a block diagram illustrating one embodiment for the broadband interface system of the present invention. A broadband interface system 200 interfaces a plurality of computer systems, such as computer system 205, 210, and 220, to the broadband system 130. The broadband interface system 200 also contains the standard broadband digital interface 140 to interface the computer systems (205, 210 and 220) to the broadband data interface 100.

In operation, the computer systems (205, 210 and 220) transmit and receive data on the standard broadband digital interface 140 to gain access and receive data from the broadband system 130 via the broadband data interface 100. For the broadband interface system 200, a plurality of computers are interfaced to the broadband data interface 100 such that the broadband data interface 100 may be placed as a gateway to the computer systems. In addition, a plurality of broadband data interfaces may be coupled to the standard broadband digital interface 140 to provide additional interfaces to additional broadband systems.

Figure 3:
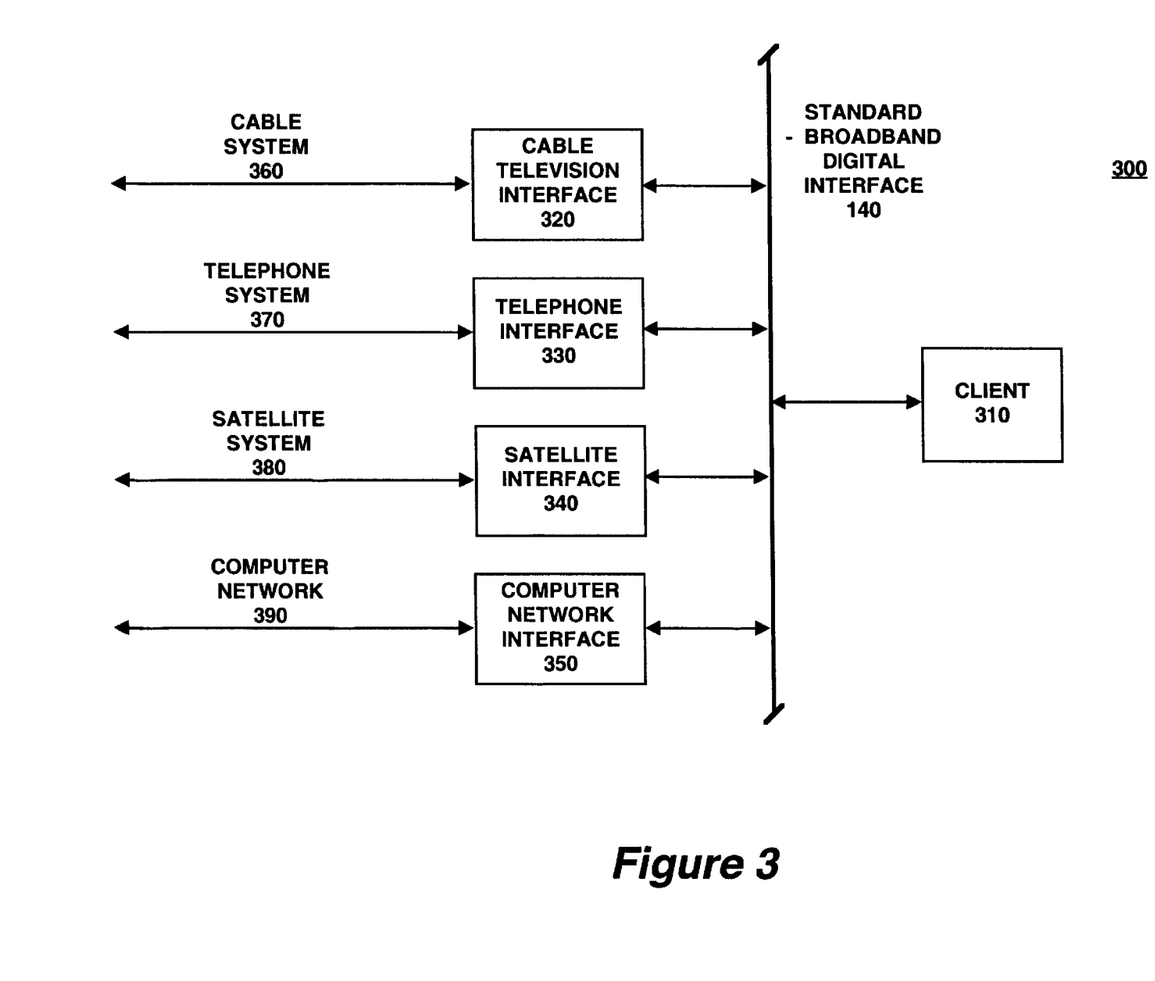
FIG. 3 is a high level block diagram illustrating a second embodiment for a broadband interface system of the present invention.

FIG. 3 is a high level block diagram illustrating a second embodiment for a broadband interface system of the present invention. A broadband interface system 300 interfaces a client 310 to a plurality of broadband systems. Specifically, the broadband interface system 300 interfaces the client 310 to a cable television system 360, telephone system 370, a satellite system 380, and a computer network 390. In order to interface the client 310 to the broadband systems, the broadband interface system 300 further includes a cable data interface 320, telephone interface 330, and a computer network interface 350.

Each broadband data interface (320, 330, 340 and 350) are customized for the particular broadband system. For example, the cable television interface 320 provides access control and modulation techniques particular to the cable system 360. Therefore, the cable system operator has complete control over the cable television interface 320. The cable system 360, telephone system 370, satellite system 380 and computer network 390 are intended to represent a broad category of broadband systems such that any broadband system may be implemented without deviating from the spirit and scope of the invention. The client 310 may contain a single user unit or a plurality of separate units. As described above, the client 310 communicates with the broadband data interfaces via the standard broadband digital interface 140.

Figure 4:
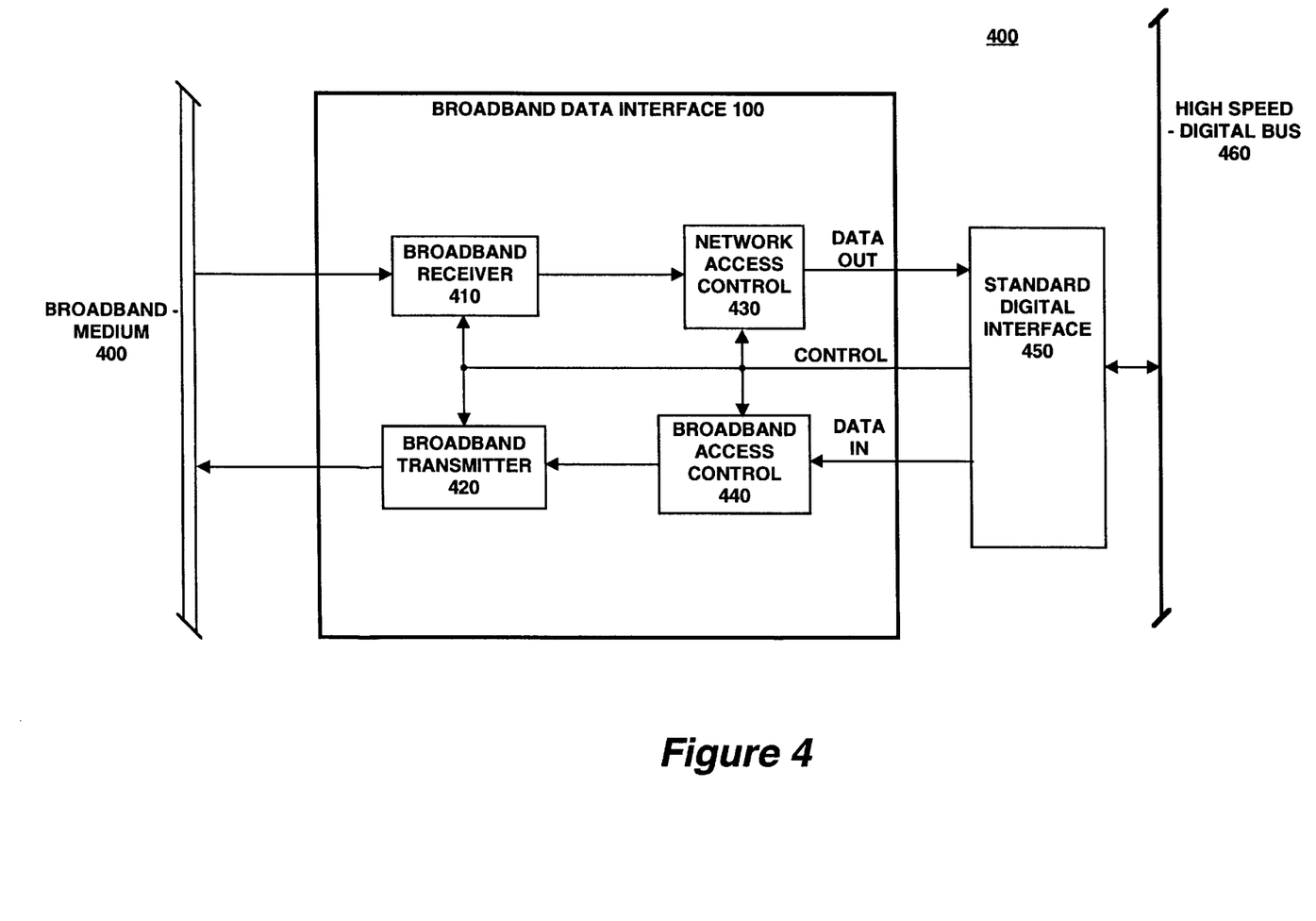
FIG. 4 is a block diagram illustrating the broadband data interface configured in accordance with the present invention.

FIG. 4 is a block diagram illustrating the broadband data interface configured in accordance with the present invention. The broadband data interface 100 is coupled to the standard broadband digital interface 140. As shown in FIG. 4, the standard broadband digital interface 140 includes a digital interface 450 and a high speed digital bus 460. The broadband data interface 100 is also coupled to a broadband medium 400, such as a coaxial cable capable of transmitting signals comprising a broadband of frequencies. In order to transfer data from the broadband medium 400 to the digital interface 450, the broadband data interface 100 contains a broadband receiver 410 and a network access controller 430. The broadband data interface 100 also includes a broadband access controller 440 and a broadband transmitter 420 in order to transfer data from the standard broadband digital interface 140 to the broadband medium 400.

The broadband receiver 410 is configured to down-link and demodulate data transferred over the broadband medium 400. The broadband receiver 410 also converts the broadband RF and data coding into a format compatible with the standard broadband digital interface 140. The broadband receiver 410 is a customized receiver configured for the particular broadband system. The network access controller 430 is also customized so that the broadband system operator controls the data transferred from the broadband medium 400 to the standard broadband digital interface 140.

The broadband access controller 440 receives the "Data In" from the digital interface 450, and provides access control for data transferred from the standard broadband digital interface 140 to the broadband medium 400. In addition, the broadband access controller 440 receives control information pertaining to the access control function (e.g. authentication information from the client). Data are transferred from the broadband access controller 440 to the broadband transmitter 420. The broadband transmitter 420 extracts the data from the digital format, as well as modulates and uplinks the data for transmission on the broadband medium 400.

Figure 5:
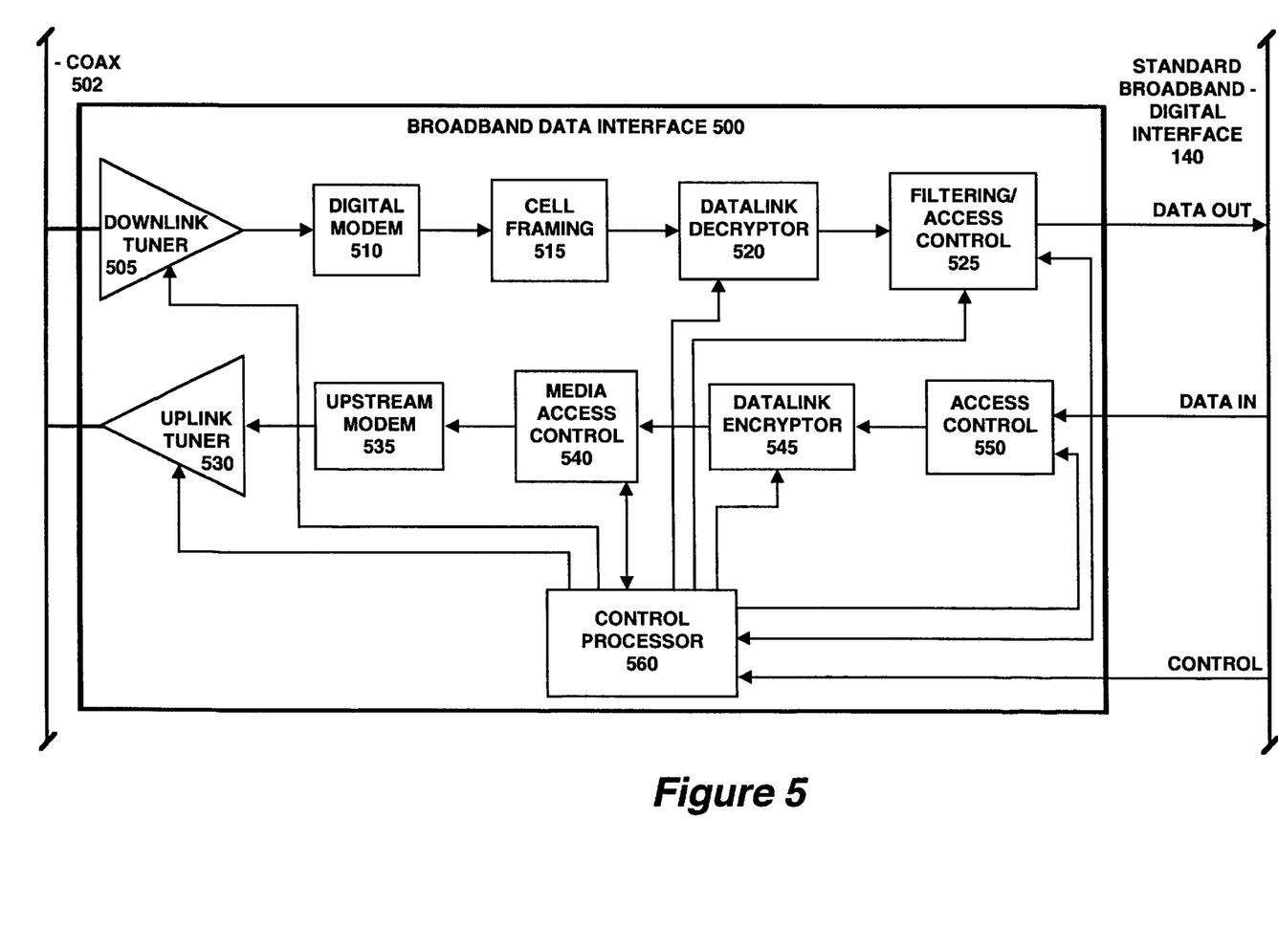
FIG. 5 is a block diagram illustrating the broadband data interface configured in accordance with one embodiment of the present invention.

FIG. 5 is a block diagram illustrating the broadband data interface configured in accordance with one embodiment of the present invention. A broadband data interface 500 interfaces a broadband medium, such as a coaxial cable 502, for a broadband system to the standard broadband digital interface 140. For the "Data Out" path (transfer of data from the coax 502 to the standard broadband digital interface 140), the broadband interface data contains a tuner 505, digital modem 510, cell framing 515, datalink decryptor 520, and filter/access control 525. The broadband data interface also contains a control processor 560 coupled to receive control information from the standard broadband digital interface 140.

As shown in FIG. 5, the downlink tuner 505 receives data from the coax 502, and receives control information from the control processor 560. In general, the downlink tuner 505 operates as a downlink to convert a radio frequency (RF) signal transmitted at a carrier frequency to a baseband signal. The control information input to the broadband data interface 500 specifies the carrier frequency for the particular data. The control processor 560 transmits the carrier frequency information to the downlink tuner 505. The downlink tuner 505 is intended to represent a broad category of downlink receivers, utilized in RF signal processing, which are well known in the art and will not be described further.

The baseband signal from the downlink tuner 505 is input to the digital modem 510. In general, the digital modem 510 operates as a demodulator to convert the analog baseband signal into a digital bit stream. The type of demodulation implemented in the digital modem 510 is dependent upon the particular broadband system. For example, the digital modem 510 may be configured to demodulate the baseband signal in accordance with the quadrature amplitude modulation 64 (QAM 64) encoding/modulation scheme. However, any RF coding scheme may be implemented in the digital modem 510, such as vestigial sideband 16 (VSB 16) and quadrature phase shift key (QPSK) modulation.

For a typical example, the digital modem 510 receives a 6 megahertz (MHz) baseband signal, and generates a 36 megabit per second bit stream. In addition to providing the demodulation function, the digital modem 510 may be configured to perform analog error correction, such as adaptive equalization and distributed cosine transfer (DCT).

The digital modem 510 is intended to represent a broad category of digital modems for demodulating encoded digital data for broadband transmission, which are well known in the art and will not be described further.

The cell framing 515 receives the bit stream from the digital modem 510. In general, the cell framing 515 provides error correction recovery as well as format conversion to convert the digital bit stream to a format compatible with the format of the standard broadband digital interface 140. The error correctional coding implemented in the cell framing 515 is specific to the particular broadband system. For example, a broadband system may implement forward error correction coding, and the cell framing 515 may implement a Reed Soloman algorithm to recover data bit stream from the error correction encoded bit stream. The implementation of error correction coding for a communication system is well known in the art and will not be described further.

In order to convert the bit stream to the standard broadband digital interface 140 format, the cell framing 515 frames the data to generate data packets in accordance with the standard broadband digital interface 140 protocol. This framing could be either ATM (asynchronous transfer mode) cell framing or higher level protocol packets like IP. For a typical data rate example described above, the cell framing 515 generates data packets that have a data rate of 30 megabits per second.

The data output from the cell framing 515 is input to the datalink decryptor 520. In general, the datalink descriptor 520 implements point-to-point decryption of data from the broadband system. The datalink decryptor 520 is coupled to the control processor 560 to receive cryptographic keys. The broadband system may utilize any type of data encryption, and therefore the datalink decryptor 520 is customized for the particular application of the broadband system. The customized data encryption permits the operator of the broadband system to control data flow from the coax 502 to the standard broad based digital interface 140.

The broadband system may utilize any type of data encryption, including public key cryptography or private key cryptography. In order to determine whether a particular client is to receive data from the broadband system, client authentication is required. In one embodiment, the client authenticates access to the control processor 560 via a control interface. If the client is authorized to receive the specified channel data, then the control processor 560 transmits the key to the datalink decryptor 520. Consequently, the datalink decryptor 520 is utilized to provide a level of access control for the broadband system operator.

Data output from the datalink decryptor 520 is input to the filtering and access control 525. In general, the filtering function in the filtering access control 525 permits the broadband data interface 500 to operate similar to a network interface card. The control processor 560 receives client address information from each client via the control interface to specify the particular information the client desires to receive. The control processor 560 is coupled to the filtering and access control 525 to provide the client address information. In one embodiment, the client transmits to the control processor 560 a list of addresses to identify data the client desires to receive.

The control processor 560 implements an access control function by controlling data passed through the filtering and access control 525. For example, a particular client may specify to the control processor 560 the client's address, a broadcast address, and a multicast address. In response, the control processor 560 provides access control by authenticating the client's access to the specified addresses. If the client is authorized to receive the specified addresses, then the control processor 560 programs the filtering and access control 525 to pass only those addresses specified to the particular client. Consequently, data are transferred from the filtering and access control 525 to the standard broadband digital interface 140.

In order to transfer data from the standard broadband digital interface 140 to the coax 502, the broadband interface 500 includes access control 550, datalink encryptor 545, media access control 540, upstream modem 535 and uplink tuner 530. The access control 550 receives "Data In" from the standard broadband digital interface 140 and control information from the control processor 560. In one embodiment, the access control 550 provides two access control functions. First, access control 550 authenticates client transmissions to ensure that a particular client has proper access to transmit over the broadband system. Second, the access control 550 determines the amount of bandwidth of the broadband system that a particular client may consume. Therefore, for each client transfer request over the broadband system, the access control 550 determines the clients that gain access, as well as the amount of bandwidth allocated to the requesting client. The access control 550 prevents one or more clients from monopolizing the entire bandwidth of the broadband system.

The output of the access control 550 is input to the datalink encryptor 545. As discussed above in conjunction with the datalink decryptor 520, the datalink encryptor 545 is customized for the particular broadband system to provide an encryption scheme selected by the broadband system operator. The datalink encryptor 545 is coupled to the control processor 560 so that the datalink encryptor 545 receives keys for encryption. An additional level of access control may be implemented in the datalink encryptor 545. In one embodiment, a requesting client authenticates transmission over the broadband system. If the client is authorized to transmit data over the broadband system, then the control processor 560 transfers a key to the datalink encryptor 545.

The output of the datalink encryptor 545 is input to media access control 540. In general, media access control 540 allocates bandwidth resources on the broadband system. For example, the media access control 540 provides collision detection such that only one message is modulated on a particular carrier frequency at any one particular time. In order to determine criteria for bandwidth allocation for the broadband system, the media access controller 540 is coupled to the control processor 560. The control processor 560 provides the appropriate control information for allocation of bandwidth to the data input. The allocation could be based on broadband network loading, required throughput, or on some negotiated quality of service. The media access controller 540 is intended to represent a broad category of such devices, which are well known in the art and will not be described further.

Data output from the media access control 540 is input to the upstream modem 535. In turn, the upstream modem 535 modulates the data in accordance with the particular modulation scheme utilized by the broadband system. As discussed above in conjunction with the digital modem 510, the broadband system may utilize, as examples, QAM 64, QAM 256, VSB 16 and QPSK modulation schemes. The upstream modem 535 is intended to represent a broad category of modulators of digital data which are well known in the art and will not be described further.

The modulated baseband output of the upstream modem 535 is input to the uplink tuner 530. The uplink tuner 530 is also coupled to the control processor 560 to receive control information. The control information identifies the carrier frequency for transmission over the broadband system. The uplink tuner 530 uplinks the analog modulated baseband signal generated by the upstream modem 535 to the carrier frequency for transmission on the coax 502. The uplink tuner 530 is intended to represent a broad category of RF transmitters and uplinks which are well known in the art and will not be described further The standard broadband digital interface 140 includes a control interface to receive control information from one or more clients. The control interface is utilized, in part, to transfer tuner control information from the client to the broadband data interface 500. In one embodiment, the client specifies the type of data for transfer on the broadband system via the tuner control information, and the control processor 560 selects a carrier frequency based on the information received from the media access control 540. The selected carrier frequency information is transferred to the uplink tuner 530 to transmit data to the broadband system. In order to receive data from the broadband system, the control processor 560 receives tuner control information from the client, and generates selected carrier frequency for the downlink tuner 505.

The control interface is also used utilized to transfer access negotiation control information. The access negotiation control information is used by the control processor 560 to authenticate clients for both receipt and transmission of data to and from the broadband system. In one embodiment, the control processor 560 supports capability reporting. In general, capability reporting permits a client to determine access and capability information available through the broadband data interface 500. For example, through use of capablity reporting, a client may determine the channels on a cable television network that are available to the particular client, or the amount of bandwidth available to transmit data over the broadband network, etc. In one embodiment, capability reporting is supported by a command that the client transfers to the control processor 560 via the control interface.

The control interface is further utilized for resource requests by the clients. In general, resource requests consist of clients requesting authorization and access to transfer information over the broadband system. For example, a client may request a data rate of 10 kilobytes per second for an application to transfer data over the broadband system. The control processor 560 determines the authorization for a client, as well as the resource availability to allocate the bandwidth for the particular resource request.

As discussed above, the broadband data interface of the present invention has application for client computer systems. A client computer system has the ability to efficiently utilize the upstream data path in the broadband data interface. For example, a digital set top converter box only transmits a constant stream of data. However, a computer system, including a computer system network, exhibits the ability to multiplex data for both receipt and transmission. As will be apparent to one skilled in the art, a computer system and a computer networking system provide numerous applications for transferring and receiving data to and from a broadband system.

Figure 6:
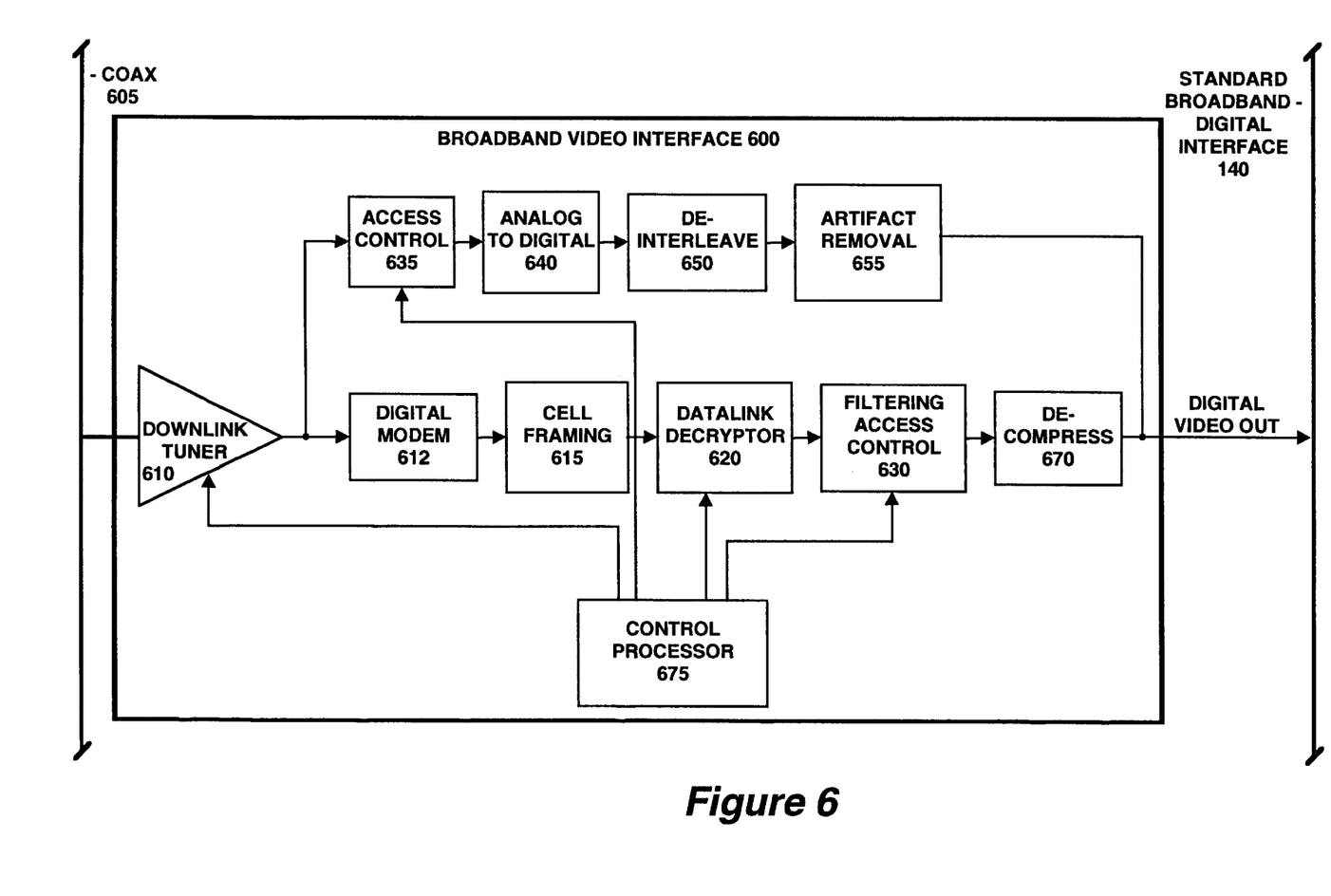
FIG. 6 illustrates a broadband video interface configured in accordance with one embodiment of the present invention.

FIG. 6 illustrates a broadband video interface configured in accordance with one embodiment of the present invention. In general, the broadband video interface 600 is capable of processing both analog and digital video. The broadband video interface 600 is coupled to a video transmission system, such as a satellite network or a cable television system. As shown in FIG. 6, the broadband video interface 600 contains a downlink tuner 610, digital modem 612, cell framing 615, data link decryptor 620, and filtering access control 630 to process the digital video. The digital modem 612 is configured to demodulate the baseband digital signal in accordance with the RF encoding of the digital video system. The operation of the downlink tuner 610, cell framing 615, data link decryptor 620, and filtering access control 630 are analogous to the operation of the downlink tuner 505, cell framing 515, data link decryptor 520, and filtering and access control 525 discussed above and illustrated in FIG. 5.

In order to generate digital video from analog video, the broadband video interface 600 contains access control 635, analog to digital converter 640, de-interleave unit 650, and artifact removal 655. The access control 635 is coupled to the control processor 675. The access control 635 permits the operator of the broadband video system to control which channels are transferred from the broadband system to the standard broadband digital interface 140. The access control 635 receives video data from the downlink tuner 610, and passes the video data to the analog to digital converter 640 if the requesting client is authorized to receive that channel. The operation of the access control 635 is analogous to the operation of filtering/access control 525 discussed above.

The digital to analog converter 640 digitizes the analog video to generate digital video. The de-interleave unit 650 reformats the digital video by extracting odd and even fields to create a continuous frame of non-interleaved digital video data. The reformatted digital video data is input to the artifact removal 655. The artifact removal 655 filters the digital video to smooth the digital video waveforms generated during the decoding process. The formatting of the digital video for display in a client computer system, and the filtering of the digital video to remove artifacts is well known in the art. The output of the artifact removal 655 is input to the standard broadband digital interface 140.

Figure 7:
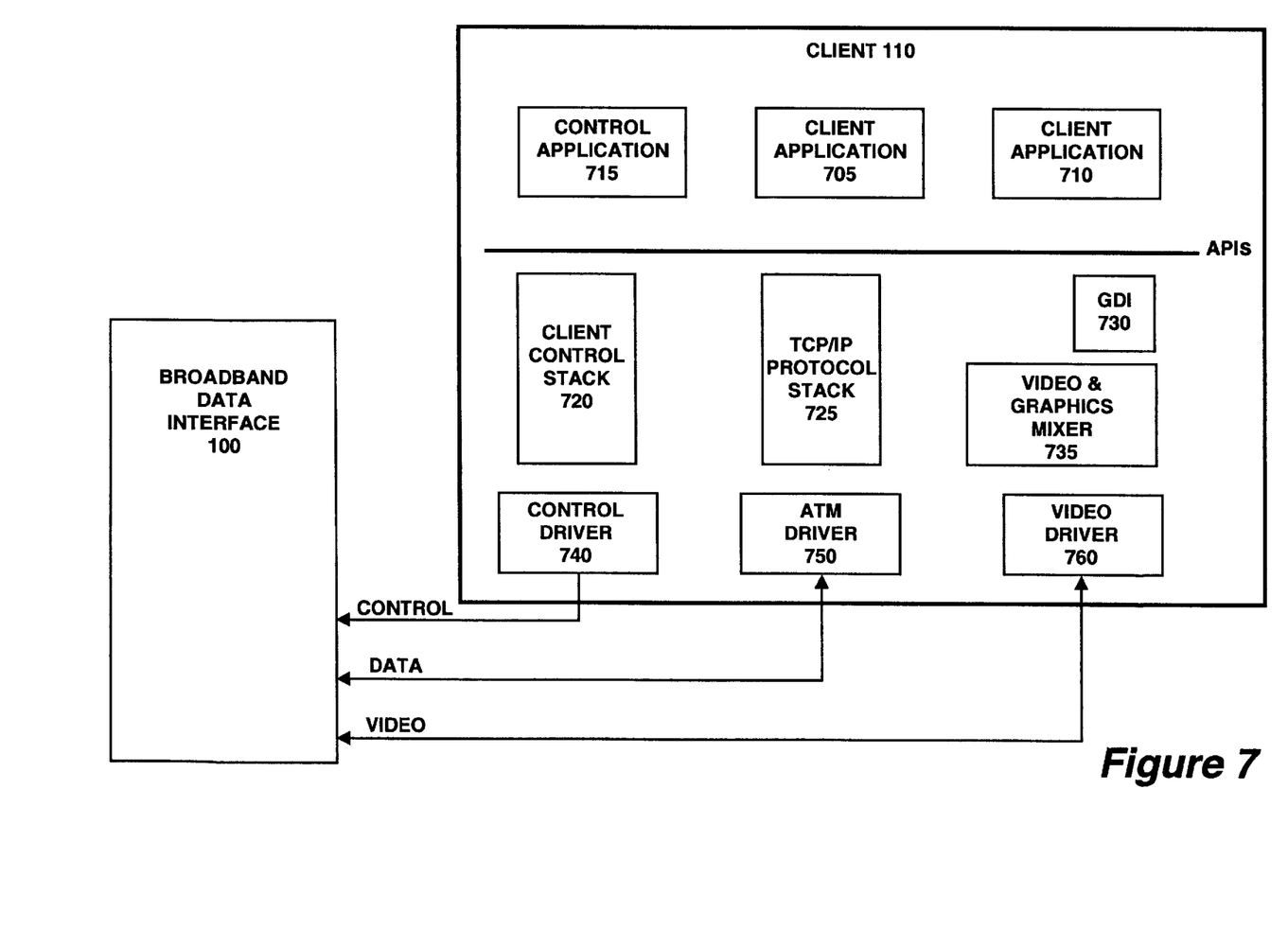
FIG. 7 illustrates one embodiment for a software client configuration incorporating the technique of the present invention.

FIG. 7 illustrates one embodiment for a software client configuration to support the broadband data interface of the present invention. For the embodiment illustrated in FIG. 7, the client 110 contains a software configuration to support a Windows™ based operating system. However, the software configuration may be implemented on any computer system implementing any operating system. The software configuration for the client 110 contains client applications 705 and 710, and a control application 715. The control application 715 supports a user interface for the client 110 to permit a user of the client 110 to control the operation of the broadband data interface 100.

In order to support networking and control of the broadband data interface 100, the software configuration of client 110 contains a client control stack 720, a TCP/IP protocol stack 725, a control driver 740 and an asynchronous transfer mode driver (ATM) 750. The control driver 740 provides the physical layer hardware interface to the control interface, and the asynchronous transfer mode driver (ATM) 750 provides the physical layer hardware interface to a standard data interface compliant with the ATM standard. The client control stack 720 receives control information from the control application 715, implements the protocol for the control interface, and transfers the control information to the control driver 740. The TCP/IP protocol stack 725 transmits and receives data to and from the client applications 705 and 710, implements the protocol for the data interface, and transmits and receives the data to and from the asynchronous transfer mode driver (ATM) 750.

The client 110 includes the capability to display digital video. In order to receive and transmit video, the software configuration further includes a graphic device interface stack (GDI) 730, video and graphic mixer 735, and a video driver 760. The GDI 730 provides a standard Windows™ stack to create an interface to the Windows™ operating system to display graphics and video on an output display for the client 110. The video driver 760 provides the physical layer hardware interface to transfer and receive video from the broadband data interface 100 to the client 110. The video and graphics mixer 735 combines graphics from the client 110, with the video from the broadband data interface 100. The video and graphics mixer 735 is intended to represent a broad category of chroma keying devices which are well known in the art.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A network comprising:
    a standard broadband digital interface to receive data from multiple broadband data sources, wherein the broadband data sources each have an associated unique broadband data protocol, and further wherein the standard broadband digital interface generates output signals to communicate data received from the broadband data sources according to an interface-client protocol; and
    one or more client devices coupled to the standard broadband interface to receive information from the broadband data sources, wherein the client devices are configured to receive the data according to the interface-client protocol.

2. The network of claim 1 wherein the standard broadband digital interface allows bi-directional communications between the one or more client devices and the one or more broadband data sources.

3. The network of claim 1 wherein the multiple broadband data sources comprises a cable television system.

4. The network of claim 1 wherein the multiple broadband data sources comprises a telephone system.

5. The network of claim 1 wherein the multiple broadband data sources comprises a satellite system.

6. The network of claim 1 wherein the multiple broadband data sources comprises a computer network.

7. The network of claim 1 wherein the standard broadband digital interface comprises:
    a broadband receiver coupled to receive broadband data from the broadband data sources and to demodulate the data according to a demodulation scheme of the broadband system, the broadband receiver further coupled to receive control signals from the standard broadband digital interface;
    a network access control device coupled to the broadband receiver and to the standard broadband digital interface to provide customized access control to the broadband data;
    a broadband transmitter coupled to transmit broadband data to the broadband data sources, the broadband transmitter configured to modulate transmitted broadband data according to a modulation scheme of the broadband system, the broadband transmitter further coupled to receive control signals from the standard broadband digital interface; and a broadband access control device coupled to the broadband transmitter and to the broadband digital interface to provide customized access control to the broadband system.

8. The network of claim 1 wherein the standard broadband digital interface comprises:

a control processor;

a broadband receiver coupled to the control processor;

a network access control coupled to the control processor, the network access control to control access to the broadband data sources;

a broadband transmitter coupled to the control processor; and a broadband access control device coupled to the control processor, the broadband access control to control access to broadband data.

9. The network of claim 8 wherein the broadband receiver comprises:

a downlink tuner coupled to received data from said broadband data sources and to receive tuner control information from said control processor;

a digital modem coupled to said downlink tuner, said digital modem demodulating said data in accordance with encoding of said broadband data source; and cell framing coupled to said modem and said network access control, said cell framing formatting said data in accordance with said broadband data source.

10. The network of claim 8 wherein the broadband transmitter comprises:

an upstream modem coupled to said broadband access control device, said upstream modem modulating said transmit data in accordance with encoding of said broadband data sources; and an uplink tuner coupled to said upstream modem and said control processor, said uplink tuner transmitting data at a carrier frequency specified by tuner control information from said control processor.

11. The network of claim 8 wherein the broadband access control device comprises:

access control coupled to authenticate a requesting client to transmit data over the broadband system;

a datalink encryptor coupled to the access control and to the control processor, the datalink encryptor coupled to receive the transmit data, wherein the datalink encryptor is configured to receive keys when a client computer system is authorized to access the broadband system, and further wherein the datalink encryptor is configured to encrypt the transmit data; and media access control coupled to the datalink encryptor and to the control processor, the media access control coupled to receive the transmit data, the media access control allocating bandwidth for the transmit data on the broadband system.

12. The network of claim 8 wherein the network access control comprise:

a filter/access control coupled to the control processor and to the broadband digital interface, the filter/access coupled to receive access information for client computer systems, the filter/access control passing data to the broadband digital interface when said a specified client computer system is authorized; and a datalink decryptor coupled to the broadband receiver and to the control processor, the datalink decryptor coupled to receive the receive data, the datalink decryptor receiving keys when client computer system is authorized to receive data from the broadband system, the datalink decryptor being configured to decrypt said receive data.

13. A method of interfacing multiple broadband data sources to one or more electronic systems, the method comprising:

receiving broadband data from the multiple broadband data sources each broadcasting data according to an associated unique broadband data protocol;

converting incoming broadband data encoded according to associated broadband data protocols to network data according to an interface-client protocol;

converting outgoing network data according to the interface-client protocol to broadband data according to appropriate broadband data protocols; and providing bi-directional access between the one or more electronic systems and the multiple broadband data sources.

14. The method of claim 13 wherein the multiple broadband data sources comprises a cable television system.

15. The method of claim 13 wherein the multiple broadband data sources comprises a telephone system.

16. The method of claim 13 wherein the multiple broadband data sources comprises a satellite system.

17. The method of claim 13 wherein the multiple broadband data sources comprises a computer network.

18. An apparatus for interfacing multiple broadband data sources to one or more electronic systems, the apparatus comprising:

means for receiving broadband data from the multiple broadband data sources each broadcasting data according to an associated unique broadband data protocol;

means for converting incoming broadband data encoded according to associated broadband data protocols to network data according to an interface-client protocol;

means for converting outgoing network data according to the interface-client protocol to broadband data according to appropriate broadband data protocols; and means for providing bi-directional access between the one or more electronic systems and the one or more broadband data sources.

19. The apparatus of claim 18 wherein the multiple broadband data sources comprises a cable television system.

20. The apparatus of claim 18 wherein the multiple broadband data sources comprises a telephone system.

21. The apparatus of claim 18 wherein the multiple broadband data sources comprises a satellite system.

22. The apparatus of claim 18 wherein the multiple broadband data sources comprises a computer network.

23. A standard broadband digital interface to receive data from multiple broadband data sources, wherein the broadband data sources each have an associated unique broadband data protocol, and further wherein the standard broadband digital interface generates output signals to communicate data received from the broadband data sources according to an interface-client protocol.

24. The standard broadband interface of claim 23 wherein the standard broadband digital interface allows bi-directional communications between one or more client devices and multiple broadband data sources.

25. The standard broadband interface of claim 23 wherein the multiple broadband data sources comprises a cable television system.

26. The standard broadband interface of claim 23 wherein the multiple broadband data sources comprises a telephone system.

27. The standard broadband interface of claim 23 wherein the multiple broadband data sources comprises a satellite system.

28. The standard broadband interface of claim 23 wherein the multiple broadband data sources comprises a computer network.

29. The digital interface of claim 23 comprising:
- a broadband receiver coupled to receive broadband data from the broadband data sources and to demodulate the data according to a demodulation scheme of the broadband system, the broadband receiver further coupled to receive control signals from the standard broadband digital interface;
- a network access control device coupled to the broadband receiver and to the standard broadband digital interface to provide customized access control to the broadband data;
- a broadband transmitter coupled to transmit broadband data to the broadband data sources, the broadband transmitter configured to modulate transmitted broadband data according to a modulation scheme of the broadband system, the broadband transmitter further coupled to receive control signals from the standard broadband digital interface; and
- a broadband access control device coupled to the broadband transmitter and to the broadband digital interface to provide customized access control to the broadband system.

30. The digital interface of claim 23 comprising:
- a control processor;
- a broadband receiver coupled to the control processor;
- a network access control coupled to the control processor, the network access control to control access to the broadband data sources;
- a broadband transmitter coupled to the control processor; and
- a broadband access control device coupled to the control processor, the broadband access control to control access to broadband data.

31. The digital interface of claim 30 wherein the broadband receiver comprises:
- a downlink tuner coupled to received data from said broadband data sources and to receive tuner control information from said control processor;
- a digital modem coupled to said downlink tuner, said digital modem demodulating said data in accordance with encoding of said broadband data source; and
- cell framing coupled to said modem and said network access control, said cell framing formatting said data in accordance with said broadband data sources.

32. The digital interface of claim 30 wherein the broadband transmitter comprises:
- an upstream modem coupled to the broadband access control device, the upstream modem modulating the transmit data in accordance with encoding of the broadband data sources; and
- an uplink tuner coupled to the upstream modem and the control processor, the uplink tuner transmitting data at a carrier frequency specified by tuner control information from the control processor.

33. The digital interface of claim 30 wherein the broadband access control device comprises:
- access control coupled to authenticate a requesting client to transmit data over the broadband system;
- a datalink encryptor coupled to the access control and to the control processor, the datalink encryptor coupled to receive the transmit data, wherein the datalink encryptor is configured to receive keys when a client computer system is authorized to access the broadband system, and further wherein the datalink encryptor is configured to encrypt the transmit data; and
- media access control coupled to the datalink encryptor and the control processor, the media access control coupled to receive the transmit data, the media access control allocating bandwidth for the transmit data on the broadband system.

34. The digital interface of claim 30 wherein the network access control comprise:
- a filter/access control coupled to the control processor and to the broadband digital interface, the filter/access coupled to receive access information for client computer systems, the filter/access control passing data to the broadband digital interface when said a specified client computer system is authorized; and
- a datalink decryptor coupled to the broadband receiver and to the control processor, the datalink decryptor coupled to receive the receive data, the datalink decryptor receiving keys when client computer system is authorized to receive data from the broadband system, the datalink decryptor being configured to decrypt said receive data.

* * * * *